US011296973B2

(12) United States Patent
Toyozumi et al.

(10) Patent No.: US 11,296,973 B2
(45) Date of Patent: Apr. 5, 2022

(54) PATH INFORMATION TRANSMISSION DEVICE, PATH INFORMATION TRANSMISSION METHOD AND PATH INFORMATION TRANSMISSION PROGRAM

(71) Applicant: Nippon Telegraph and Telephone Corporation, Tokyo (JP)

(72) Inventors: Kazuto Toyozumi, Musashino (JP); Ken Takahashi, Musashino (JP); Shigemasa Kumagawa, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/969,735

(22) PCT Filed: Feb. 14, 2019

(86) PCT No.: PCT/JP2019/005239
§ 371 (c)(1),
(2) Date: Aug. 13, 2020

(87) PCT Pub. No.: WO2019/160005
PCT Pub. Date: Aug. 22, 2019

(65) Prior Publication Data
US 2021/0006485 A1 Jan. 7, 2021

(30) Foreign Application Priority Data
Feb. 15, 2018 (JP) .............................. JP2018-025410

(51) Int. Cl.
*H04L 45/02* (2022.01)
*H04L 12/46* (2006.01)
(52) U.S. Cl.
CPC .......... *H04L 45/02* (2013.01); *H04L 12/4641* (2013.01)

(58) Field of Classification Search
USPC ........................................................ 370/254
See application file for complete search history.

(56) References Cited

U.S. PATENT DOCUMENTS 6,751,220 B1 * 6/2004 Li ....................... H04L 12/4641
370/390
7,496,661 B1 * 2/2009 Morford ............. H04L 41/5025
709/224
(Continued)

OTHER PUBLICATIONS

Bates et al., "Multiprotocol Extensions for BGP-4," Internet Engineering Task Force (IETF), Feb. 1998, 9 pages.
(Continued)

*Primary Examiner* — Anthony Mejia
(74) *Attorney, Agent, or Firm* — Fish & Richardson P.C.

(57) ABSTRACT

[Problem] A route information transfer device that transfers packets advertising route information between routers of different service types is provided.
[Solution] The route reflector (route information transfer device) 1 includes: a packet reception unit 11 that receives packets from a PE (router) 2; an information update unit 120 that updates a parameter related to the service type included in the received packet according to the PE 2 and the virtual private network, and stores the updated parameter in the service-type information storage unit 13; an information conversion unit 14 that refers to the service-type information storage unit 13 and converts the parameter related to the service type of the source PE2 of the packet into a parameter related to a service-type of the destination PE 2 in an identical virtual private network; and a packet transmission unit 16 that transmits a packet including the converted parameter to the destination PE 2.

9 Claims, 7 Drawing Sheets

(56) References Cited

U.S. PATENT DOCUMENTS

| | | | |
|---|---|---|---|
| 7,684,391 B2* | 3/2010 | Liu | H04L 69/161 370/389 |
| 7,843,843 B1* | 11/2010 | Papp, III | H04L 43/00 370/252 |
| 8,693,323 B1* | 4/2014 | McDysan | H04L 45/50 370/230 |
| 9,106,530 B1* | 8/2015 | Wang | H04L 12/4641 |
| 9,225,597 B2* | 12/2015 | Tubaltsev | H04L 45/02 |
| 9,590,901 B2* | 3/2017 | Tubaltsev | H04L 45/586 |
| 10,855,530 B2* | 12/2020 | Zhang | H04L 12/4641 |
| 11,018,940 B2* | 5/2021 | Zhang | H04L 41/5003 |
| 2003/0227907 A1* | 12/2003 | Choi | H04L 29/06027 370/352 |
| 2005/0013295 A1* | 1/2005 | Regan | H04L 45/50 370/389 |
| 2005/0053079 A1* | 3/2005 | Havala | H04L 45/50 370/400 |
| 2005/0141531 A1* | 6/2005 | Kinoshita | H04L 29/12405 370/401 |
| 2006/0092971 A1* | 5/2006 | Okita | H04L 12/2854 370/468 |
| 2006/0112272 A1* | 5/2006 | Morioka | H04L 63/0442 713/171 |
| 2008/0170573 A1* | 7/2008 | Ould-Brahim | H04L 45/66 370/392 |
| 2008/0172732 A1* | 7/2008 | Li | H04L 45/04 726/15 |
| 2010/0172257 A1* | 7/2010 | Yu | H04L 63/0245 370/252 |
| 2012/0109913 A1* | 5/2012 | Rajure | H04L 45/54 707/694 |
| 2015/0078152 A1* | 3/2015 | Garg | H04L 41/0668 370/219 |
| 2018/0048666 A1* | 2/2018 | Alderson | H04L 45/20 |
| 2018/0375765 A1* | 12/2018 | Osborne | H04L 45/50 |
| 2019/0140960 A1* | 5/2019 | Liang | H04L 12/4641 |
| 2019/0236648 A1* | 8/2019 | Yokoyama | H04W 60/04 |
| 2020/0287826 A1* | 9/2020 | Wang | H04L 12/4679 |

OTHER PUBLICATIONS

Mahalingam et al., "Virtual eXtensible Local Area Network (VXLAN): A Framework for Overlaying Virtualized Layer 2 Networks over Layer 3 Networks," Internet Engineering Task Force (IETF), Aug. 2014, 22 pages.

Sajassi et al., "BGP MPLS-Based Ethernet VPN," Internet Engineering Task Force (IETF), Feb. 2015, 56 pages.

* cited by examiner

Fig. 1

SERVICE-TYPE INFORMATION STORAGE UNIT 13

TABLE FOR PE2₁

| Community | VTEP | RT | E-Tag | SERVICE TYPE |
|---|---|---|---|---|
| 1 | 1.1.1.1 | 10:10 | 1 | A |
| 2 | 1.1.1.1 | 10:30 | 2 | A |

TABLE FOR PE2₂

| Community | VTEP | RT | E-Tag | SERVICE TYPE |
|---|---|---|---|---|
| 1 | 3.3.3.3 | 10:20 | 0 | B |
| 2 | 4.4.4.4 | 10:30 | 0 | B |

P₁

| Community | VTEP | RT | E-Tag |
|---|---|---|---|
| 1 | 1.1.1.1 | 10:10 | 1 |
| 2 | 1.1.1.1 | 10:30 | 2 |

P₂

| Community | VTEP | RT | E-Tag |
|---|---|---|---|
| 1 | 3.3.3.3 | 10:20 | 0 |
| 2 | 4.4.4.4 | 10:30 | 0 |

Fig. 2

| SERVICE TYPE | | Community | RT CONVERSION | E-TAG CONVERSION |
|---|---|---|---|---|
| SOURCE (SOURCE PE) | DESTINATION (DESTINATION PE) | | | |
| A | A | x | DESTINATION RT OF X (NO CHANGE) | E-TAG CONVERSION (NO CHANGE) |
| A | B | | DESTINATION RT OF X | E-Tag=0 |
| B | A | | DESTINATION RT OF X | E-Tag=x |
| B | B | | DESTINATION RT OF X (NO CHANGE) | E-TAG CONVERSION (NO CHANGE) |

PATH INFORMATION TRANSMISSION DEVICE, PATH INFORMATION TRANSMISSION METHOD AND PATH INFORMATION TRANSMISSION PROGRAM

CROSS-REFERENCE TO RELATED APPLICATIONS

This application is a National Stage application under 35 U.S.C. § 371 of International Application No. PCT/JP2019/005239, having an International Filing Date of Feb. 14, 2019, which claims priority to Japanese Application Serial No. 2018-025410, filed on Feb. 15, 2018. The disclosure of the prior application is considered part of the disclosure of this application, and is incorporated in its entirety into this application.

TECHNICAL FIELD

The present invention relates to a route information transfer device, a route information transfer method, and a route information transfer program that advertise a route of a network.

BACKGROUND ART

Network service virtualization technologies have tried to transfer L2 packets by constructing a virtual L2 (layer-2) tunnel on a L3 (layer 3) network. One of the exemplary techniques is Virtual eXtensible Local Area Network (VXLAN) (see Non Patent Literature 1). As a method for performing MAC/IP address learning in the VXLAN, Ethernet (tradename) Virtual Private Network (E-VPN) has been standardized (see Non Patent Literature 2). The E-VPN uses Multi Protocol Border Gateway Protocol (MP-BGP) for exchange of route information between devices required for L2 tunnel construction (see Non Patent Literature 3).
The E-VPN uses the MP-BGP to advertise route information (MAC/IP address), thereby creating a virtual router (Virtual Routing and Forwarding (VRF) of a virtual routing table) in a device (router) located at an end point of the network.

Figure 7:
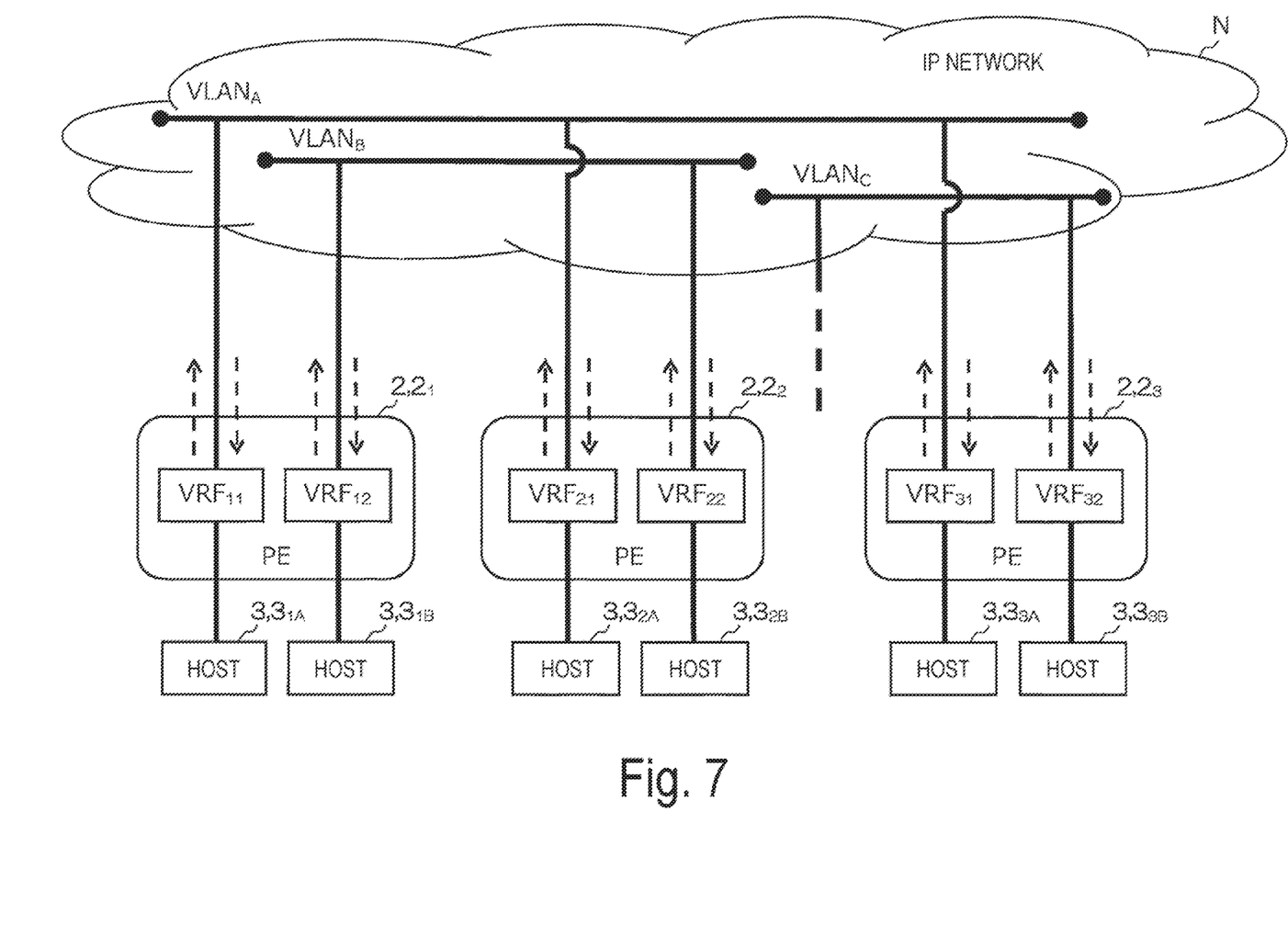
FIG. 7 is an explanatory view for describing the flow of route information in constructing a L2 tunnel in a known IP network.

Referring now to FIG. 7, a known flow of route information for constructing the L2 tunnels on an IP network N will be described. FIG. 7 illustrates that a plurality of routers (PE: Provider Edge) 2 are connected to the IP network N. The PEs 2 ($2_1$, $2_2$, $2_3$, . . . ) each are connected to a plurality of network hosts (hereinafter simply referred to as hosts) 3 such as computers, and have virtual routers (VRF) for L2 tunnels therein.

For example, when the host 3A, the host $3_{2A}$, and the host $3_{3A}$ constitute the L2 tunnel, a $VRF_{11}$ (virtual router) of PE $2_1$ (router) containing the host $3_{1A}$ sends a packet (BGP packet) for advertising the MAC/IP address to a BGP peer (other PE) linked in a meshed manner.
Next, the incoming router, for example, PE $2_2$, reads the received packet to get Route Target (RT) and Ethernet Tag (E-tag) information for identifying VRF and VPN respectively, determines that the received packet is a packet destined for VRF of its own, and registers the information from the $VRF_{11}$ of PE $2_1$ with a routing table. This series of operations enables exchange of the MAC/IP address between the devices (routers) to construct a L2 tunnel ($VLAN_A$).
To do such BGP peer formation, there are options: directly forming the BGP peer between the routers (PEs 2); or introducing a route information transfer device called a route reflector into the network, forming the BGP peer with the route reflector, and exchanging the MAC/IP address via the route reflector.

CITATION LIST

Patent Literature

Non Patent Literature 1: "Virtual eXtensible Local Area Network (VXLAN): A Framework for Overlaying Virtualized Layer 2 Networks over Layer 3 Networks," [online], IETF RFC7348, [Searched on Jan. 30, 2018], Internet <URL: http://tools.ietf.org/html/rfc7348>
Non Patent Literature 2: "Multiprotocol Extensions for BGP-4," [online], IETF RFC2283, [Searched on Jan. 30, 2018], Internet <URL: https://tools.ietf.org/html/rfc2283>
Non Patent Literature 3: "BGP IPLS-Based Ethernet VPN," [online], IETF RFC7432, [Searched on Jan. 30, 2018], Internet <URL: https://tools.ietf.org/html/rfc7432>

SUMMARY OF THE INVENTION

Technical Problem

In the known E-VPN MAC/IP address advertisement, there are three service types in terms of specification. As described in the Non Patent Literature 3, the E-VPN has three types of service types depending on the correspondence with broadcast domain and bridge domain: VLAN-Based Service Interface, VLAN Bundle Service Interface and VLAN-Aware Bundle Service Interface.
No communication is guaranteed between these different service types. Different service types use different parameters. Between E-VPN with the different service types, the device (router) that receives the MAC/IP address advertisement cannot determine whether or not the received packet is a packet destined for the device of its own.
Thus, there is a problem in that, in the virtual network between different service types, the MAC/IP address cannot be exchanged, failing to construct the L2 tunnel.
In response to the above issue, an object of the present invention is to provide a route information transfer device, a route information transfer method and a route information transfer program that can perform matching between E-VPNs with different service types and construct the L2 tunnel even in the virtual network between different service types.

Means for Solving the Problem

In order to solve the problem, the invention according to claim 1 is a route information transfer device for transferring a packet between routers of different service types, the packet advertising route information in a virtual private network, and the route information transfer device includes: a packet reception unit configured to receive the packet from a source router of the routers; an information update unit configured to update a parameter related to a service type included in the packet received by the packet reception unit according to the source router and the virtual private network, and to store the parameter in a storage unit; an information conversion unit configured to refer to the storage unit and convert the parameter related to the service type of the source router of the packet into a converted parameter related to a service type of a destination router of the routers in an identical virtual private network; and a packet transmission unit configured to transmit a packet including the converted parameter converted by the information conversion unit to the destination router.

In order to solve the problem, the invention according to claim 5 is a route information transfer method for transferring a packet between routers of different service types, the packet advertising route information in a virtual private network, and the route information transfer method includes: receiving the packet from a source router of the routers; updating a parameter related to the service type included in the received packet according to the source router and the virtual private network, and storing the parameter in a storage unit; referring to the storage unit and converting the parameter related to the service type of the source router of the packet into a parameter related to a service type of a destination router of the router in an identical virtual private network; and transmitting a packet including the converted parameter to the destination router.

According to the invention of according to claims 1 and 5, in transferring route information between routers in the virtual private network, the route information transfer device can transmit and receive the packet between routers with different types by converting the parameter related to the service type into a parameter of the destination router.

According to the invention according to claim 2, in the route information transfer device according to claim 1, when the parameter related to the service type of the destination router corresponding to the packet received by the packet reception unit has not been stored in the storage unit, the information conversion unit holds the packet received by the packet reception unit until the parameter related to the service type of the destination router is stored.

According to the invention according to claim 2, even when the parameter related to the service type of the destination router has not been stored in the storage unit, the route information transfer device can hold the packet until the parameter is stored. In this manner, when the packet is received from the destination router and the parameter related to the service type is stored in the storage unit, the route information transfer device can transmit the packet to the destination router.

Further, according to the invention according to claim 3, in the route information transfer device according to claim 2, when the parameter related to the service type of the destination router corresponding to the received packet has not been stored in the storage unit, the information conversion unit requests the destination router to update the route information.

According to the invention of claim 3, even when the parameter related to the service type of the destination router has not been stored in the storage unit, the route information transfer device can request the destination router to update the route information, thereby quickly updating the parameter related to the service type. This enables the route information transfer device to send the route information for the source router quickly to the destination router.

According to the invention according to claim 4, in the route information transfer device according to claim 1, the storage unit stores a MAC/IP address of a host connected to the source router or the destination router, and when the parameter related to the service type of the destination router corresponding to the packet received by the packet reception unit has not been stored in the storage unit, the information conversion unit transmits the MAC/IP address of the host connected to the destination router to the source router.

According to the invention according to claim 4, even when the parameter related to the service type of the destination router has not been stored in the storage unit, and the packet does not reach the destination, the route information transfer device can notify the MAC/P address of the host connected to the destination route, to the source router, thereby helping an exchange of route information.

The invention according to claim 6 is a route information transfer program for causing a computer to function as the route information transfer device according to any one of claims 1 to 5.

According to the invention according to claim 6, each function of the route information transfer device according to any one of claims 1 to 4 can be achieved using a general computer.

Effects of the Invention

The present invention enables a virtual private network including the L2 tunnel to be constructed even between routers with different service types by converting the parameter related to the service type depending on the destination router.

DESCRIPTION OF EMBODIMENTS

An embodiment of the present invention will be described below with reference to the drawings.

Summary of Route Advertisement System

Figure 1:
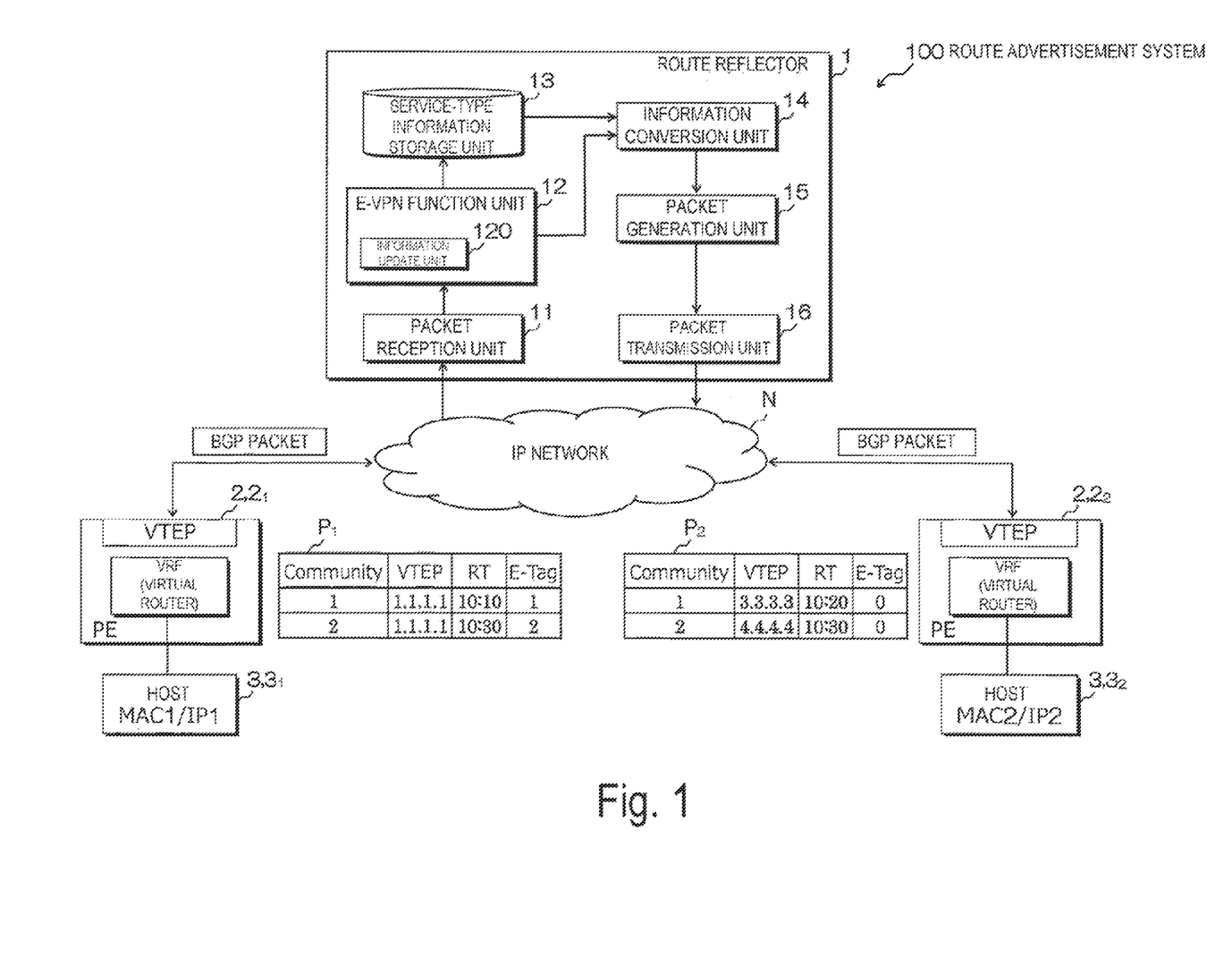
FIG. 1 is a block diagram illustrating an overall configuration of a route advertisement system including a route reflector (route information transfer device) according to an embodiment of the present invention.

Referring first to FIG. 1, a route advertisement system 100 including a route reflector 1 in accordance with an embodiment of the invention is described.

The route advertisement system 100 serves to advertise route information for constructing a virtual private network (E-VPN) to a router in an IP network N.

As illustrated in FIG. 1, the route advertisement system 100 is configured by connecting a route reflector 1 to a plurality of PEs (routers) 2 on the IP network N. Note that, for ease of explanation, the number of PEs 2 is set to two, but may be three or more. A host 3 is connected to each PE 2.

The route reflector (route information transfer device) 1 transfers a BGP packet (UPDATE, which is a packet that advertises route information in the virtual private network (E-VPN), between routers with an identical or different service types.

The route reflector 1 modifies a parameter that varies depending on the service type of the BGP packet received from one PE 2 (for example, PE 2₁) to a parameter receivable in another PE 2 (for example, PE 2₂), and transfers the route information. The configuration and operation of the route reflector 1 will be described later in detail.

The PE. (router) 2 constructs a virtual L2 tunnel on a L3 network. Although one virtual router (VRF) is illustrated in PE 2 in FIG. 1, a plurality of VRFs may be created. To construct the L2 tunnel, the PE 2 uses MP-BGP to exchange route information with another PE 2.

Each PE 2 advertises the route information via the route reflector 1 to create the virtual router (VRF) in the device (PE 2) of its own located at the end point of the network.

Note that the PE 2₁ and PE 2₂ are assumed to be routers having different service type specifications. Here, the PE 2₁ is supposed to operate according to the specification of the service type of VLAN-Based Service, while the PE 2₂ is supposed to operate according to the specification of the service type ofVLAN Bundle Service Interface or VLAN-Aware Bundle Service Interface.

As illustrated in FIG. 1, the BGP packet (UPDATE) includes values of "Community", "VTEP", "RT", and "E-Tag", which are parameters $P_1$ and $P_2$, as information on the service type (service-type information).

"Community (VPN identification information)" refers to additional information added to the route information, and here, VXLAN Network ID (VNI), which is information for identifying E-VPN in the VXLAN, is set. For example, by setting Community of UPDATE transmitted by PE 2₁ to "1" and Community of UPDATE transmitted by PE 2₂ to "1", both can be recognized to be in an identical VPN.

"VTEP (Virtual Tunnel End Point)" is an address indicating the end point of the L2 tunnel. For example, it is a loopback address of PE 2.

"RT (Route Target)" is information for identifying VRF (virtual router), and here, it is information set by "AS number: any value". Note that the AS number is a value uniquely assigned to the network system (the route advertisement system 100) in advance.

"E-Tag (Ethernet Tag)" is information for identifying E-VPN. The E-Tag varies in value depending on the service type. Because the service type of the PE 2₁ is VLAN-Based Service Interface, any value other than "0" (1, 2, etc.) is set to E-Tag. On the other hand, because the service type of the PE 2₂ is VLAN Bundle Service Interface or VLAN-Aware Bundle Service Interface, "0" is set to the E-Tag.

The host 3 is a common network host such as a computer and thus, the description thereof is omitted.

As described above, the route reflector 1 converts parameters of PEs 2 of different service types (schemes) into mutually receivable parameters, enabling the route advertisement system 100 to advertise route information.

The configuration and operations of the route reflector 1 will be described below in detail.

Configuration of Route Reflector

The configuration of the route reflector 1 will be described below with reference to FIG. 1. As illustrated in FIG. 1, the route reflector 1 includes a packet reception unit 11, an E-VPN function unit 12, a service-type information storage unit 13, an information conversion unit 14, a packet generation unit 15, and a packet transmission unit 16.

The packet reception unit 11 receives a BGP packet from the PE 2 via the IP network N. The packet reception unit 11 outputs the received BGP packet to the E-VPN function unit 12.

The E-VPN Function unit 12 is a processing unit for enabling the function of the E-VPN. For example, the E-VPN function unit 12 performs general processing such as analysis of the packet. According to the present invention, the E-VPN function unit 12 includes an information update unit 120.

The information update unit 120 stores information (such as the parameters $P_1$. $P_2$) related to the service type of the received BGP packet in the service-type information storage unit 13 according to the PE 2 and the E-VPN, and updates the information sequentially.

When the value of Community for identifying the E-VPN included in the BGP packet is a new value, the information update unit 120 stores information related to the service type in the service-type information storage unit 13. In the case where other information (VTEP, RT, E-Tag) corresponding to the value of Community changes, the information update unit 120 updates the information stored in the service-type information storage unit 13.

Figure 2:
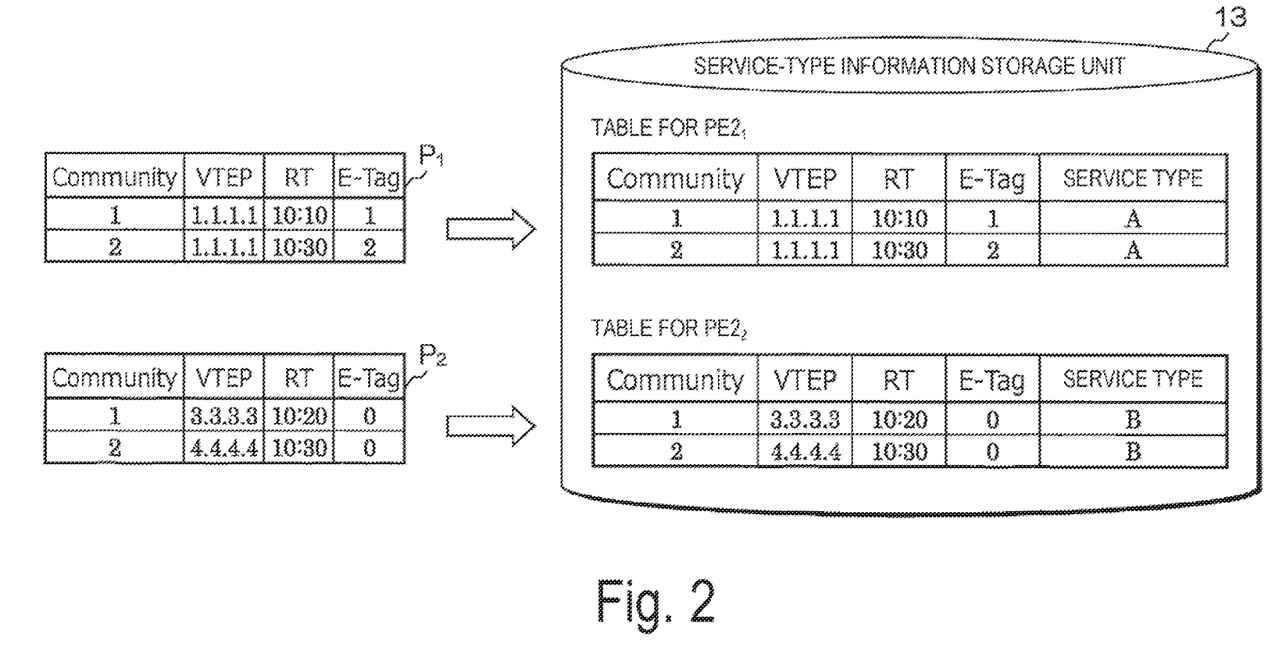
FIG. 2 is an explanatory view for describing contents stored in a service-type information storage unit.

For example, as illustrated in FIG. 2, the information update unit 120 stores parameter $P_1$, which is information contained in BGP packets received from PE 2₁, in a table format in the service-type information storage unit 13. At this time, the information update unit 120 stores a predetermined value (designated here as "A") indicating that the value of E-Tag is not "0" as the service type in the service-type information storage unit 13.

As illustrated in FIG. 2, the information update unit 120 also stores parameter $P_2$ which is information contained in the BGP packet received from PE 2₂, in a table format in the service-type information storage unit 13. At this time, the information update unit 120 stores a predetermined value (designated here as "B") indicating that the value of E-Tag is "0" as the service type in the service-type information storage unit 13.

Note that "A" and "B" are added here to facilitate distinction between service types. The service type can be determined from the value of E-Tag in practice, and thus need not be stored in the service-type information storage unit 13.

Returning to FIG. 1, the configuration of the route reflector 1 continues to be described.

The E-VPN function unit 12 outputs the received BGP packet to the information conversion unit 14.

The service-type information storage unit (storage unit) 13 stores information related to the service type updated by the information update unit 120 of the E-VPN function unit 12 according to the PE 2 and the E-VPN (Community) (see FIG. 2). The service-type information storage unit 13 can be constituted of a general storage medium such as a hard disk, a semiconductor memory, or the like.

The information related to the service type, which is stored in the service-type information storage unit 13, is referred by the information conversion unit 14.

The information conversion unit 14 refers to the service-type information storage unit 13 to convert the service-type information (RT and E-Tag) such that the BGP packet may be received at the destination PE 2.

Note that when the service-type information about the destination PE 2 has not been stored in the service-type information storage unit 13, the information conversion unit 14 temporarily stores (holds) the received BGP packet in a memory (not shown) until the information is updated with the service-type information by BGP packet periodically transmitted from destination PE 2 and then, converts the service-type information (RT and E-Tag) at the time when the service-type information about the destination PE 2 is newly stored. Alternatively, when the service-type information about the destination PE 2 has not been stored in the service-type information storage unit 13, the information conversion unit 14 may request the destination PE 2 to update the route information (BGP UPDATE).

The information conversion unit 14 outputs values of RT and E-Tag converted for each destination together with values of Community and VTEP to the packet generation unit 15. Note that when the source and destination have an identical service type, the information conversion unit 14 outputs the values of RT and E-Tag as they are, without change, to the packet generation unit 15.

Figure 3:
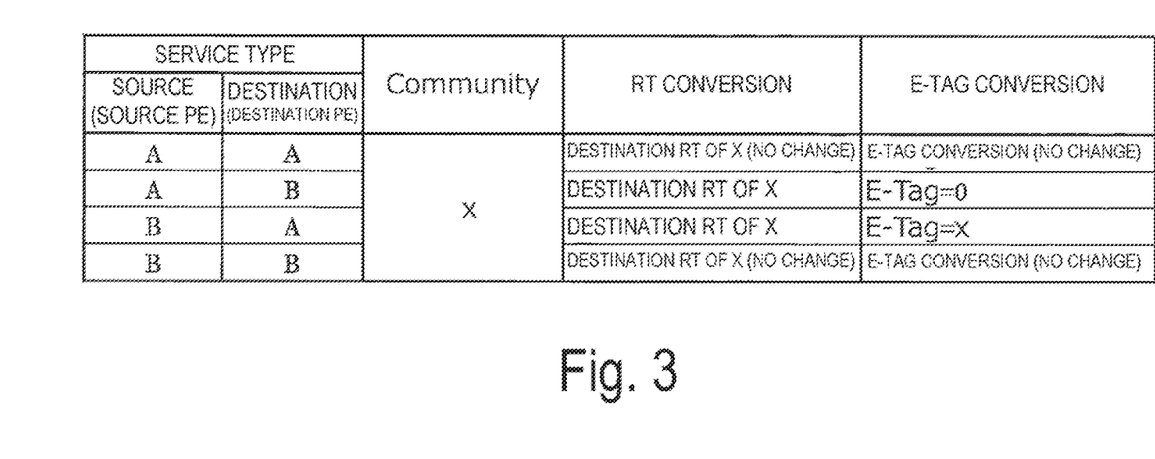
FIG. 3 is an explanatory view for describing conversion rules of parameters in an information conversion unit.

Next, contents of the service-type information (RT and E-Tag) converted by the information conversion unit 14 will be described with reference to FIG. 3. FIG. 3 illustrates conversion rules for the service-type information by the information conversion unit 14.

As illustrated in FIG. 3, the information conversion unit 14 converts RT and E-Tag only when the source (source PFE) and the destination (source PE) have different service types.

In other words, when the service type of the source (source PE) is "A" and the service type of the destination (destination PE) is "B", given that the value of Community of the received BGP packet value is "x", the information conversion unit 14 converts the relevant RT to the RT corresponding to the x of the destination (destination PE) stored in the service-type information storage unit 13. The information conversion unit 14 converts E-Tag to "0".

When the service type of the source (source PE) is "B" and the service type of the destination (destination PE) is "A", given that the value of Community of the received BGP packet value is "x", the information conversion unit 14 converts the relevant RT to the RT corresponding to the x of the destination (destination PE) stored in the service-type information storage unit 13. The information conversion unit 14 converts E-Tag to the value "x" of Community.

Returning to FIG. 1, the configuration of the route reflector 1 continues to be described.

The packet generation unit 15 generates the BGP packet for each destination by using the values of RT and E-Tag converted as necessary in the information conversion unit 14, the values of Community and VTEP, and the route information included in the received BGP packet.

The packet generation unit 15 outputs the generated BGP packet to the packet transmission unit 16.

The packet transmission unit 16 transmits the BGP packet generated by the packet generation unit 15 to the destination PE 2 via the IP network N.

Configuring the route reflector 1 as described above enables the service type of the source to be converted into the service type of the destination in route information transfer of E-VPN, which allows the route reflector 1 to perform communication between the PEs 2 with different service types. This allows the route reflector 1 to advertise the MAC/IP address between PEs 2 with different service types, thereby constructing the L2 tunnel.

Note that the route reflector 1 can operate a program (route information transfer program) for causing a computer not illustrated to function as each of the components constituting the route reflector 1.

Operations of Route Reflector

Figure 4:
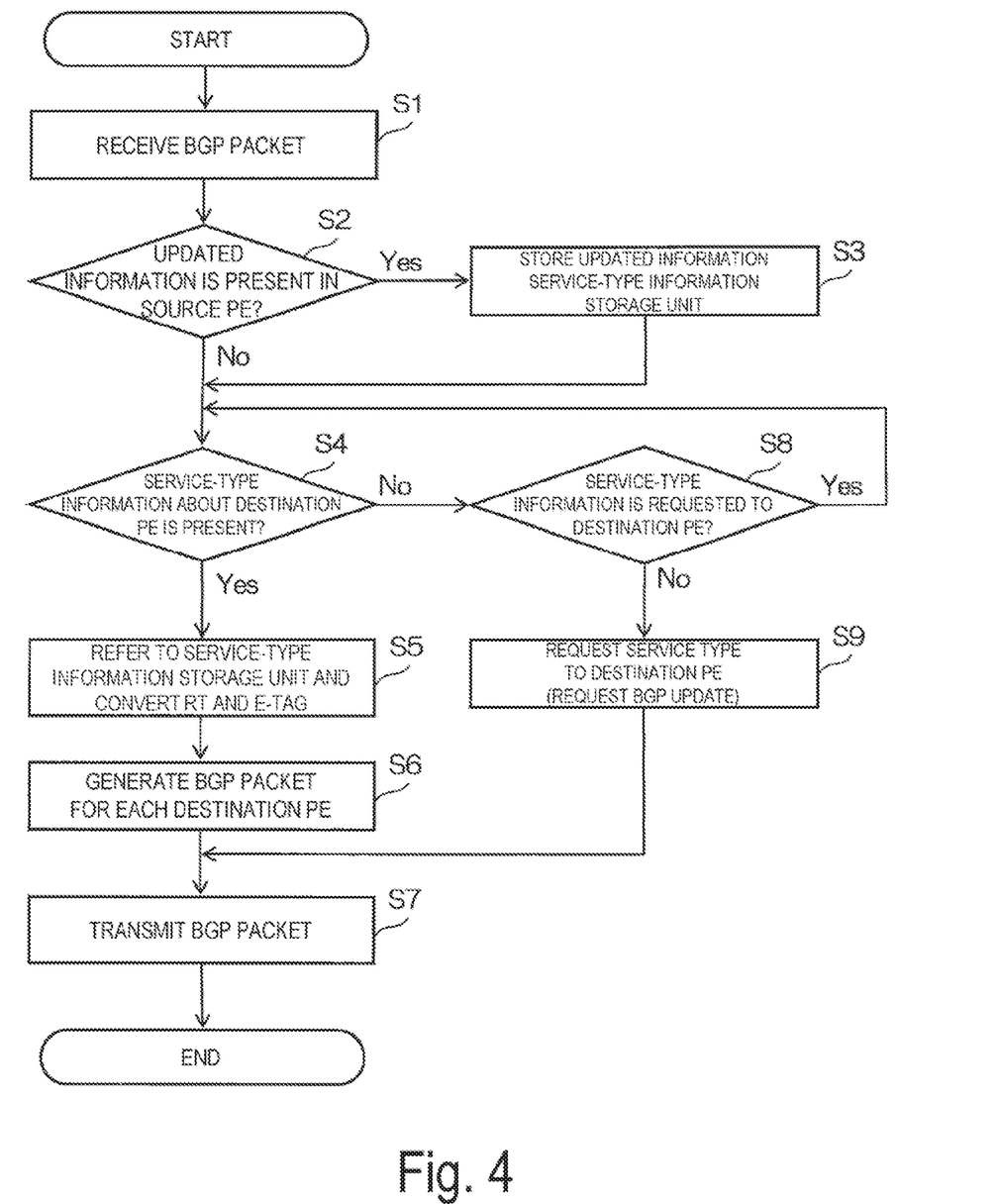
FIG. 4 is a flowchart illustrating operations of the route reflector according to the embodiment of the present invention.

Next, the operations of the route reflector 1 (route information transfer method) will be described with reference to FIG. 4 (see FIG. 1 for the configuration as appropriate). FIG. 4 is a flowchart illustrating operations of the route reflector 1 from the reception of a BGP packet to transfer of the BGP packet to the transfer to another PE.

First, the packet reception unit 11 in the route reflector 1 receives a BGP packet, which includes route information, transmitted from the source PE (for example, PE $2_1$) via the IP network N (step S1).

Then, the information update unit 120 of the E-VPN function unit 12 in the route reflector 1 determines whether or not updated information is present in the source PE (step S2). In other words, the information update unit 120 refers to the service-type information storage unit 13, and determines that the updated information is present in the source PE when the value of Community included in the received BGP packet is not present in a source PE table, other information (VTEP, RT, E-Tag) corresponding to the value of an identical Community varies.

Here, when determining from the BGP packet that the source PE contains updated information (Yes in step S2), the information update unit 120 stores (adds or updates) the service-type information about the source PE in the service-type information storage unit 13 (step S3).

When the BGP packet indicates that the source PE contains no updated information (the source PE already stored the information) (No in step S2), or after the service-type information about the source PE is stored in the service-type information storage unit 13 (after step S3), the information update unit 120 in the route reflector 1 determines whether or not the service-type information about the destination PE (for example, PE $2_2$) is stored in the service-type information storage unit 13 (step S4).

When the service-type information about the destination PE is stored in the service-type information storage unit 13 (Yes in step S4), the information conversion unit 14 in the route reflector 1 converts RT and E-Tag with reference to the service-type information storage unit 13 (step S5). In other words, when the source PE and the destination PE have different service types, the information conversion unit 14 converts the RT and E-Tag according to the conversion rules illustrated in FIG. 3.

Then, the packet generation unit 15 in the route reflector 1 uses the service-type information converted in the step S5 to generate a BGP packet corresponding to the destination PE (step S6).

Then, the packet transmission unit 16 in the route reflector 1 transmits the BGP packet generated in the step S6 to the destination PE via the IP network N (step S7).

When the service-type information about the destination PE has not been stored in the service-type information storage unit 13 in the step S4 (No in step S4), the information conversion unit 14 in the route reflector 1 determines whether or not the service-type information has been already requested to the destination PE (step S8).

Here, when the service-type information has been already requested to the destination PE (Yes in step S8), the information conversion unit 14 holds the received BGP packet and returns to the step S4 to wait until the service-type information about the destination PE is updated.

On the other hand, when the service-type information has not been requested to the destination PE (No in step S8), the information conversion unit 14 requests UPDATE from the destination PE 2. For example, the information conversion unit 14 may generate a BGP packet including a request to softreset a BGP session, and transmit the BGP packet to the destination PE (step S7). This software reset allows the route reflector 1 to retrieve UPDATE as anew session.

Note that the operations in the steps S8, S9 are not necessarily required. When step S4 finds that the service-type information about the destination PE has not been stored in the service-type information storage unit 13 (No in step S4), the BGP packet may be held until the service-type information about the destination PE is updated.

The operations described above enables the service type of the source to be converted into the service type of the destination in route information transfer of E-VPN, which allows the route reflector 1 to perform communication even between PEs 2 with different service types.

Transfer Example of BGP Packet

Figure 5:
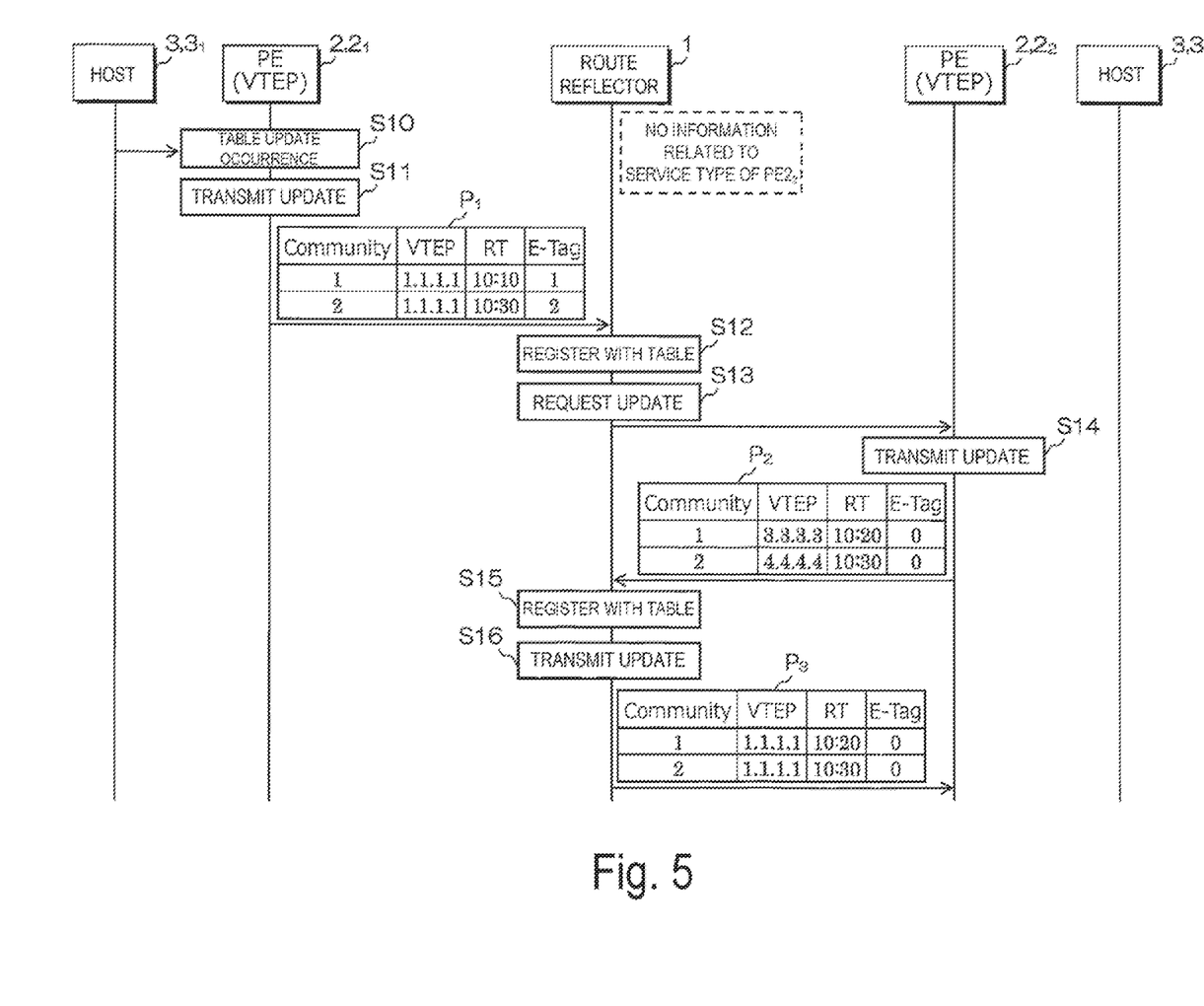
FIG. 5 is a sequence diagram illustrating a transfer example of a BGP packet using the route reflector according to the embodiment of the present invention.
Figure 6:
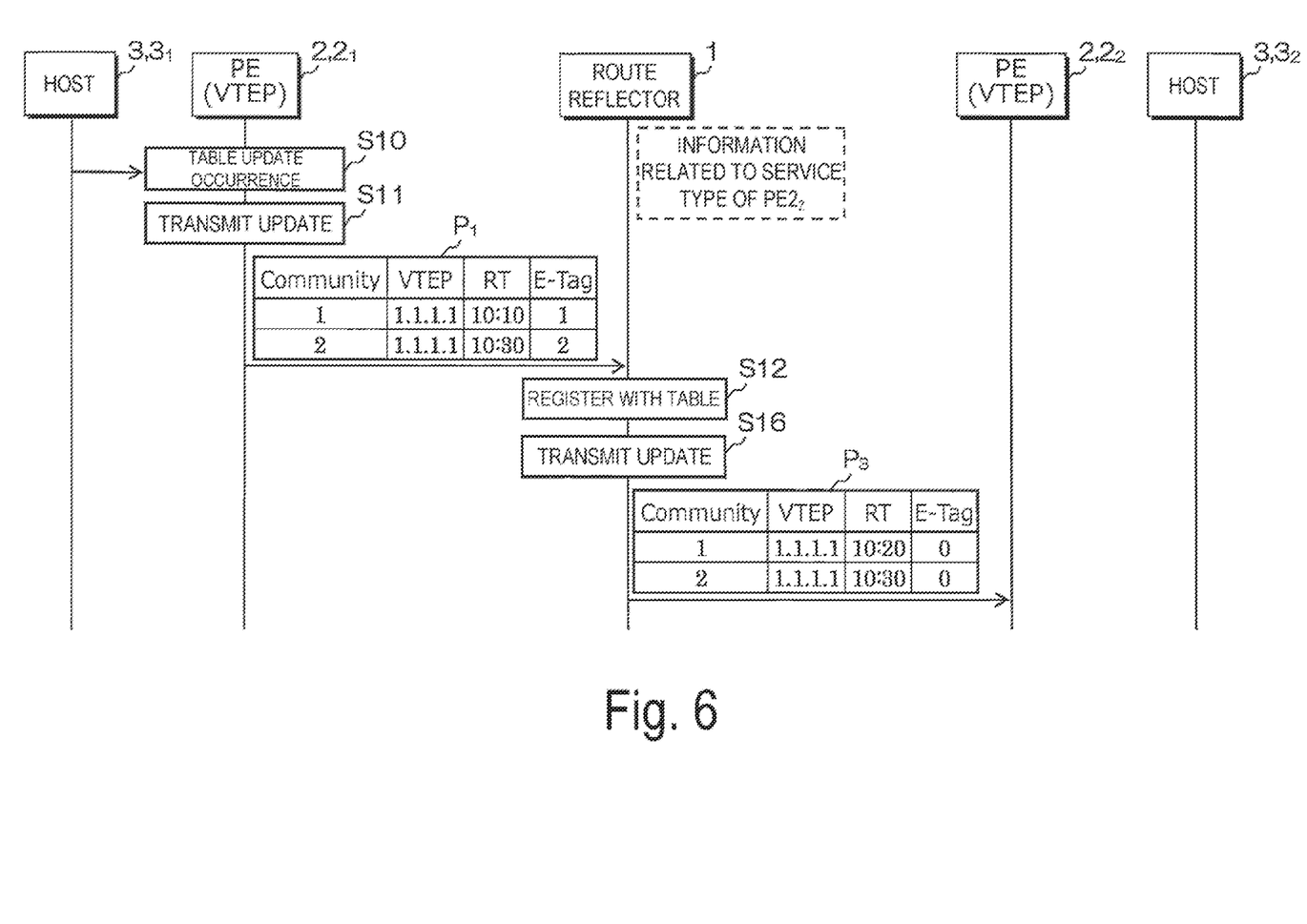
FIG. 6 is a sequence diagram illustrating another transfer example of the BGP packet using the route reflector according to the embodiment of the present invention.

Turning now to FIG. 5 and FIG. 6, a transfer example of the BGP packet in the route advertisement system 100 will be described. FIG. 5 is a sequence diagram in the absence of information for converting the service-type information (RT and E-Tag) in the route reflector 1. FIG. 6 is a sequence diagram in the presence of the information for converting the service-type information (RT and E-Tag) in the route reflector 1. Here, it is assumed that the route advertisement system 100 shown in FIG. 1 transmits a BGP packet (UPDATE) from PE $2_1$ to PE $2_2$.

Transfer Example 1

First, a transfer example of the BGP packet in the route advertisement system 100 will be described with reference to FIG. 5 (see FIG. 1 as appropriate).

In response to an action, such as a request from a host $3_1$, the PE $2_1$ detects an update occurrence event of service-type information for advertising new route information (MAC/IP address) (step S10).

Then, the PE $2_1$ transmits a BGP packet (UPDATE) to the route reflector 1 (step S11).

Here, information related to the service type added to UPDATE includes two types of parameters $P_1$: {Community "1", VTEP "1.1.1.1", RT "10:10", E-Tag "1" }, and {Community "2", VTEP "1.1.1.1", RT "10:30", E-Tag "2"}.

Then, the route reflector 1 registers the parameters $P_1$, which is included in the received BGP packet (UPFATE), with the service-type information storage unit 13 (step S12) in a table format.

Here, because information for converting the service-type information into information for the PE $2_2$ is not present in the route reflector 1 (service-type information storage unit 13), the route reflector 1 requests UPDATE to PE $2_2$ (steps S13).

Then, PE $2_2$ transmits the BGP packet (UPDATE) to the route reflector 1 (step S14).

Here, information related to the service type added to UPDATE includes two types of parameters $P_2$: {Community "1" VTEP "3.3.3.3", RT "10:20", E-Tag "0" } and {Community "2", VTEP "4.4.4.4",RT "10:30", E-Tag "0" }.

Then, the route reflector 1 registers the parameters $P_2$, which is included in the received BGP packet (UPDATE), with the service-type information storage unit 13 in a table format (step S15).

Thereby, the route reflector 1 stores information necessary for the conversion of service-type information in the BGP packet transmitted and received by the PE $2_1$ and the PE$2_2$.

Then, the route reflector 1 converts the parameter $P_1$ to parameter $P_2$, and transmits the BGP packet (UPDATE) to PE $2_2$ (step S16).

At this time, the information conversion unit 14 in the route reflector 1 converts the parameter $P_1$ to the parameter $P_3$ according to the conversion rules illustrated in FIG. 3.

Because the value of E-Tag in the UPDATE parameter $P_1$ transmitted from PE $2_1$ is not "0", the PE$2_1$ has the service type "A". On the contrary, because the value of E-Tag in the UPDATE parameter $P_2$ transmitted from PE $2_2$ is "0", the PE $2_2$ has the service type "B". In other words, the PE $2_1$ and PE $2_2$ have different service types. Then, as illustrated in FIG. 3, the route reflector 1 converts the RT corresponding to the Community "1" in the parameter $P_1$ into "10:20", which is the RT of PE $2_2$, and converts E-Tag into "0". The route reflector 1 converts the RT corresponding to Community "2" in parameter $P_1$ into "10:30" which is RT of PE $2_2$ (here, an identical), and converts E-Tag into "0".

In this way, the route reflector 1 transmits UPDATE, which includes a converted parameter $P_3$, to PE $2_2$. This enables the PE $2_2$ to recognize BGP packet (UPDATE), which is transmitted in step S16, as the packets directed to itself.

Transfer Example 2

Next, another transfer example of the BGI packet in the route advertisement system 100 will be described with reference to FIG. 6 (see FIG. 1 as appropriate).

The example of FIG. 6 contains the information for converting the service-type information (RT and E-Tag) in the route reflector 1, and thus the steps S13 to S15 of the sequence illustrated in FIG. 5 may be omitted.

In this way, when the route reflector 1 holds the information for converting the service-type information (RT and E-Tag), the route reflector 1 can transfer the BGP packet without requesting UPDATE.

Embodiments of the present invention have been described above, but the present invention is not limited to this embodiment.

Here, when the information related to the service type of the destination PE has not been stored, the route reflector 1 holds the BGP packet until the information is stored or requests UPDATE.

However, the MAC/IP addresses of the host connected to the destination PE may be previously stored in the service-type information storage unit 13 of the route reflector 1, and the MAC/IP address of the destination may be transmitted to the source PE 2 of the BGP packet (UPDATE).

This allows the source PE 2 to acquire the MAC/IP address, even when the service-type information (RT and E-Tag) cannot be temporarily converted.

As described above, in advertising of route information (MAC/IP address) using E-VPN, the route reflector 1 can construct the E-VPN between routers having different schemes by modifying a difference between service types (schemes).

The rout reflector 1 also enables the E-VPN to be constructed between routers having different schemes. This allows a network to be constructed even if large-scale renewal or review of a network is required.

In addition, the use of the route reflector 1 allows for the construction of networks that achieve the optimal functionality, performance, and cost without affecting existing equipment that are different in manufacturer and scheme.

REFERENCE SIGNS LIST

1 Route reflector (route information transfer device)
11 Packet reception unit
12 E-VPN functional part
120 Information update unit
13 Service-type information storage unit (storage unit)
14 Information exchange unit
15 Packet generation unit
16 Packet transmission unit 2 PE (router)
3 Host
100 Route advertisement system

The invention claimed is:

1. A route information transfer device for transferring packets between routers of different service types, the route information transfer device comprising:
   a packet reception unit, including one or more processors, configured to receive a first packet from a source router of the routers, the first packet configured to advertise route information in a virtual private network;
   an information update unit, including one or more processors, configured to update a parameter related to a service type included in the first packet received by the packet reception unit according to the source router and the virtual private network, and to store the parameter in a storage unit;
   an information conversion unit, including one or more processors, configured to refer to the storage unit and convert the parameter related to the service type of the source router into a converted parameter related to a service type of a destination router of the routers in an identical virtual private network; and
   a packet transmission unit, including one or more processors, configured to transmit a second packet including the converted parameter to the destination router, wherein:
      the information conversion unit is configured to determine whether the parameter related to the service type of the destination router is stored in the storage unit and, in response to a determination that the parameter related to the service type of the destination router is not stored in the storage unit, hold the first packet received by the packet reception unit until the parameter related to the service type of the destination router is determined to be stored in the storage unit.

2. The route information transfer device according to claim 1, wherein
   the information conversion unit is configured to determine whether the parameter related to the service type of the destination router is stored in the storage unit and, in response to a determination that the parameter related to the service type of the destination router is not stored in the storage unit, request the destination router to update the route information.

3. The route information transfer device according to claim 1, wherein
   the storage unit is configured to store a MAC/IP address of a host connected to the source router or the destination router, and
   the information conversion unit is configured to determine whether the parameter related to the service type of the destination router is stored in the storage unit and, in response to a determination that the parameter related to the service type of the destination router is not stored in the storage unit, transmit the MAC/IP address of the host to the source router.

4. A route information transfer method for transferring packets between routers of different service types, the route information transfer method comprising:
   receiving a first packet from a source router of the routers, the first packet advertising route information in a virtual private network;
   updating a parameter related to a service type included in the first packet received from the source router according to the source router and the virtual private network, and storing the parameter in a storage unit;
   referring to the storage unit, and converting the parameter related to the service type of the source router into a converted parameter related to a service type of a destination router of the routers in an identical virtual private network;
   transmitting a second packet including the converted parameter to the destination router;
   determining whether the parameter related to the service type of the destination router is stored in the storage unit; and
   in response to determining that the parameter related to the service type of the destination router is not stored in the storage unit, requesting the destination router to update the route information.

5. The route information method according to claim 4 further comprising:
   determining whether the parameter related to the service type of the destination router is stored in the storage unit; and
   in response to determining that the parameter related to the service type of the destination router is not stored in the storage unit, holding the first packet received by the packet reception unit until the parameter related to the service type of the destination router is determined to be stored in the storage unit.

6. The route information method according to claim 4 further comprising:
   storing a MAC/IP address of a host connected to the source router or the destination router in the storage unit;
   determining whether the parameter related to the service type of the destination router is stored in the storage unit; and
   in response to determining that the parameter related to the service type of the destination router is not stored in the storage unit, transmitting the MAC/IP address of the host to the source router.

7. A non-transitory computer readable medium storing instructions that when executed by a computer cause the computer to perform a route information method for transferring packets between routers of different service types, the route information transfer method comprising:
   receiving a first packet from a source router of the routers, the first packet advertising route information in a virtual private network;
   updating a parameter related to a service type included in the first packet received from the source router according to the source router and the virtual private network, and storing the parameter in a storage unit;
   referring to the storage unit, and converting the parameter related to the service type of the source router into a converted parameter related to a service type of a destination router of the routers in an identical virtual private network;
   transmitting a second packet including the converted parameter to the destination router;
   determining whether the parameter related to the service type of the destination router is stored in the storage unit; and
   in response to determining that the parameter related to the service type of the destination router is not stored in the storage unit, requesting the destination router to update the route information.

8. The non-transitory computer readable medium according to claim 7, wherein the route information method further comprises:
   determining whether the parameter related to the service type of the destination router is stored in the storage unit; and
   in response to determining that the parameter related to the service type of the destination router is not stored in the storage unit, requesting the destination router to update the route information.

9. The non-transitory computer readable medium according to claim 7, wherein the route information method further comprises:
   storing a MAC/IP address of a host connected to the source router or the destination router in the storage unit;
   determining whether the parameter related to the service type of the destination router is stored in the storage unit; and
   in response to determining that the parameter related to the service type of the destination router is not stored in the storage unit, transmitting the MAC/IP address of the host to the source router.

\* \* \* \* \*